United States Patent Office 3,682,736
Patented Aug. 8, 1972

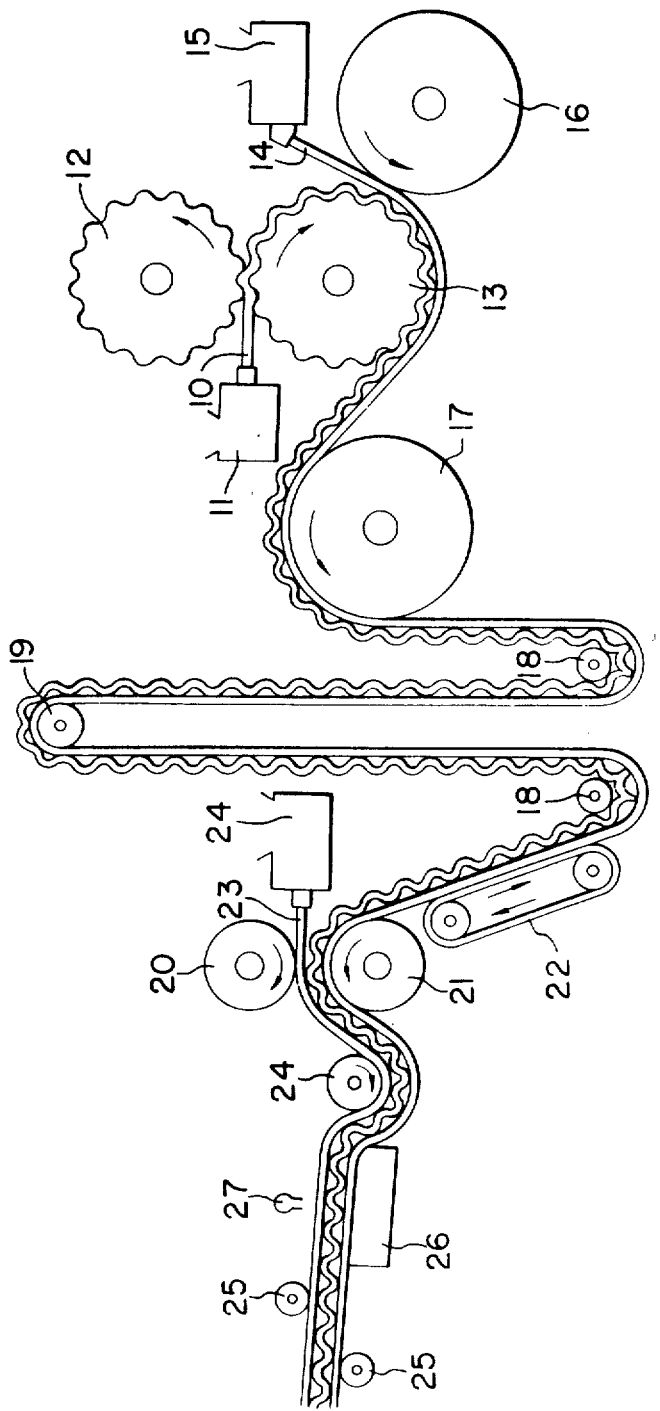

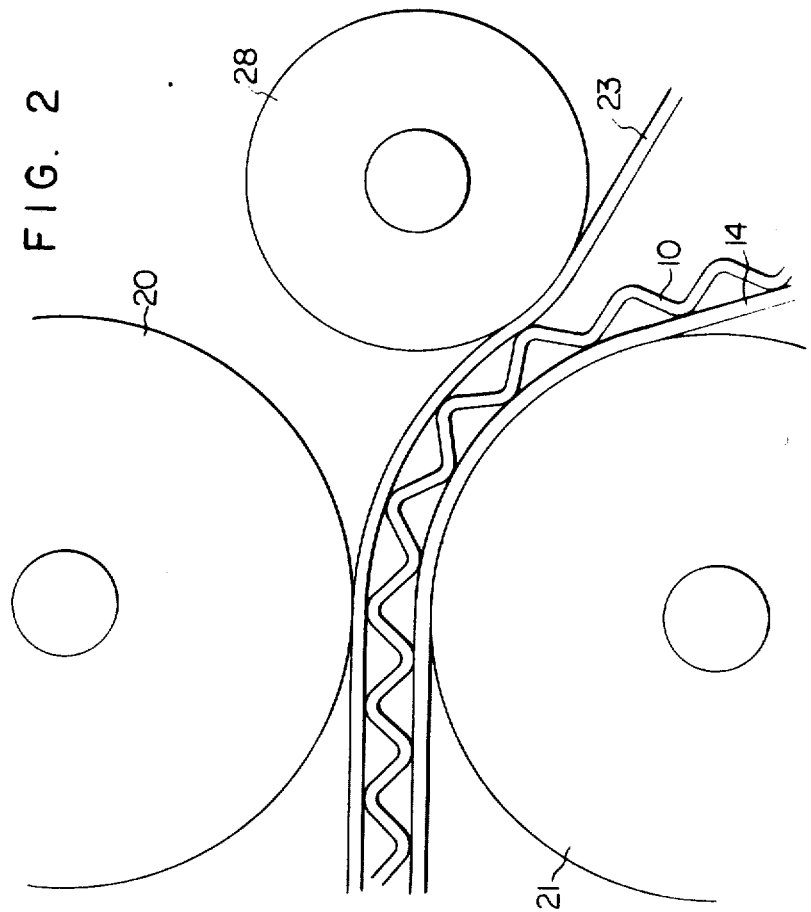

3,682,736
METHOD FOR THE CONTINUOUS MANUFACTURE OF CORRUGATED CARDBOARDS OF SYNTHETIC RESIN
Susumu Akamatsu, Naruto-shi, Japan, assignor of a fractional part interest to Susumu Akamatsu and Mitsubishi Kasei Kogyo Kabushiki Kaisha (also trading as Mitsubishi Chemical Industries Limited), Tokyo, Japan
Filed July 9, 1969, Ser. No. 842,080
Claims priority, application Japan, July 18, 1968, 43/50,661; Aug. 28, 1968, 43/61,007; Sept. 17, 1968, 43/67,113, 43/67,114
Int. Cl. B32f 1/20
U.S. Cl. 156—210                5 Claims

ABSTRACT OF THE DISCLOSURE

In manufacturing a corrugated carboard of synthetic resin, a sheet of thermoplastic resin is extruded at a high temperature and corrugated by means of a pair of corrugating rolls maintained at a temperature lower than the extruded sheet and then a second sheet similarly extruded is bonded to the corrugated sheet at a high temperature. After cooling the single faced corrugated cardboard another extruded sheet of thermoplastic resin may be bonded to the opposite side of the corrugated sheet to form a double faced corrugated cardboard.

BACKGROUND OF THE INVENTION

This invention relates to a method and apparatus for the continuous manufacture of corrugated cardboards of synthetic resin, more particularly corrugated cardboards prepared by bonding flat sheets and corrugated sheets of thermoplastic resin.

Heretofore corrugated cardboards have generally been made of paper. Although corrugated cardboards of paper have many merits, their resistance to water and chemicals is low and their tear strength is also low. These defects can be readily eliminated when sheets or films of thermoplastic resin are substituted for paper.

SUMMARY OF THE INVENTION

It is an object of this invention to provide corrugated cardboards of light weight and improved mechanical, physical and chemical characteristics.

A further object of this invention is to continuously manufacture corrugated cardboards without using any bonding agent or an applicator thereof.

Another object of this invention is to provide corrugated cardboards which are free of warp and other deformation.

According to a preferred embodiment of this invention, a corrugated cardboard is prepared by heating and extruding a first sheet (or film) of thermoplastic resin through an extruder, passing the sheet through a pair of corrugating rolls to corrugate it before it is completely cooled to and solidified, extruding a second sheet of thermoplastic resin through a second extruder, bonding the second sheet while it is at a sufficiently elevated temperature to effect fusion or adhesion against the corrugated sheet while it is carried by one of the corrugating rolls to form a single faced corrugated cardboard, and cooling the single faced corrugated cardboard thus formed from the side of the second sheet to a temperature lower than a temperature at which the single faced corrugated cardboard undergoes deformation by elongation etc. To prepare a double faced corrugated cardboard having sheets bonded to both sides thereof, said single faced corrugated cardboard is passed along a portion of the periphery of a roll with its corrugated sheet facing outwardly. A third sheet is extruded and bonded to the corrugated sheet in the same manner as above described.

Although the thermoplastic resin employed in this invention is not limited to any particular type, ordinarily it is preferable to use polyethylene, polypropylene, polystyrene, polyvinyl chloride or polyvynilidene chloride in the form of sheets or films or foamed sheets or films.

To corrugate the sheet it is important to pass the sheet through corrugating rolls immediately after it has been extruded and is not yet completely cooled and solidified. Namely, it is at an elevated temperature permitting plastic deformation. This is necessary since if the sheet were cooled, it could not be shaped or corrugated satisfactorily without being broken.

Where a solidified and stabilized sheet is reheated for a corrugating operation, release of the corrugated sheet from the corrugating rolls results in breakage or deformation of the corrugated sheet due to elongation. In the corrugating operation wherein the sheet is passed through the nip of a pair of corrugating rolls it is necessary to carefully control the temperature of the corrugating rolls, because, if the temperature is otherwise not controlled, corrugations would not be formed as desired or the corrugated sheet would be deformed. The temperature of corrugating rolls is generally determined dependent upon the type of the thermoplastic resin used so that it is impossible to specify the temperature range. With polyethylene, however, it has been found that it is advantageous to maintain the first corrugating roll at a temperature of from 60 to 90° C. while maintaining the second corrugating roll at a temperature of from 75 to 110° C. With these temperature ranges the corrugated sheet will be successively sent out in the engagement with the second corrugating roll, since the corrugated sheet tends to temporarily adhere to the second corrugating roll which is maintained at a higher temperature than the first corrugating roll. Furthermore, such temperature control is effective to sufficiently cool and solidify the corrugations to a state not to be deformed by pressure. Although the temperature control employed in this invention is not limited to any particular structure, it is preferable to use a cooling medium.

Then a second sheet is bonded to one side of the corrugated sheet by means of a facer roll as above described. It is preferable to maintain the facer roll at a temperature ranging from 75 to 115° C. The second sheet should be bonded immediately after extrusion so that it can be readily adhered and fused to the corrugated sheet. Thus, in accordance with this invention, the second sheet is bonded by adhesion to the corrugated sheet by the unique utilization of the adhesive ability of the surface of the second sheet immediately after the extrusion thereof without utilizing any bonding agent or a mechanism for application thereof.

Bonding of the second sheet to the corrugated sheet should be performed while the latter is still being carried by the second corrugating roll. This is important to prevent deformation of the finished corrugated cardboard. Where the second sheet is bonded to a corrugated sheet which has already left the corrugated roll, since, as mentioned above, the second sheet is still at an elevated temperature, the heat of the second sheet will cause deformation of the corrugated sheet, thus producing rejects.

The resultant single faced corrugated cardboard having a flat sheet bonded to one side thereof is then removed from the second corrugating roll. It is advantageous to cool and set the single faced corrugated cardboard immediately after its removal from the second corrugating roll for the purpose of preventing deformation of the corrugated cardboard due to elongation and the like applied thereto in the succeeding process steps. Such cooling is generally accomplished by means of a roller cooled to a temperature below 80° C. and is held against the second sheet. Cooling can be enhanced by a spray of cold water against the corrugated cardboard while it is still being carried by the second corrugating roll.

Another flat sheet may be bonded in the same manner to the opposite side of the single faced corrugated cardboard. In fabricating a double faced corrugated cardboard with flat sheets bonded to opposite sides, a third sheet is extruded from a third extruder and bonded to the side of the single faced corrugated cardboard opposite to the side to which the second sheet has been bonded while the third sheet retains the ability of adhesion.

In bonding the third sheet, it is necessary to bond it to the single faced corrugated cardboard having the second sheet bonded to one side with the spacing or pitch between corrugations temporarily broadened. This is true since in the single faced corrugation cardboard the second sheet has already been sufficiently cooled and solidified whereas the third sheet is still in the adhesive state whereby the third sheet contracts when it is cooled after bonding. For this reason the finished corrugated cardboard tends to deflect toward the side to which the third sheet is bonded, thus making it impossible to obtain a flat corrugated cardboard. Further, in bonding the third sheet it is necessary to cool the single faced corrugated cardboard from the side of its second sheet to a temperature below the thermal deformation temperature (a temperature at which the heated thermoplastic resin undergoes deformation due to elongation, pressing, etc. applied thereto during subsequent steps) in order to prevent deformation of the cardboard due to the heat of the third sheet. This is especially necessary when foamed sheets are employed. Bonding of the third sheet can be performed by passing the single faced corrugated cardboard and the third sheet through the nip between two cooperating press rollers. In this case, in order to prevent the aforementioned thermal deformation, the press roller urged against the third sheet is maintained at a higher temperature than that of the other roller urged against the second sheet. Where polyethylene is used as the third sheet it is usually extruded at a temperature higher than 130° C., so that the press roll urged against the third sheet is maintained at a temperature ranging from about 75 to 90° C. while the roller urged against the second sheet is maintained at a temperature below 60° C.

After bonding, the double faced corrugated cardboard issuing from the press rolls tends to be wavy. To prevent this tendency, it is advantageous to apply to the single faced corrugated cardboard against the second sheet tension acting in the direction opposite to the movement of the single faced corrugated cardboard before it passes through the nip of press rolls.

Since it is not possible to effect perfect cooling and solidification or setting of the double faced corrugated cardboard with both the second and third sheets by temperature control of the press rolls, it is advantageous to provide suitable means to further cool the double faced corrugated cardboard after bonding of the third sheet. Such additional cooling can be advantageously carried out by means of a cooler disposed to contact the second sheet and a cold air spray against the third sheet. The cooler is cooled to cause the shape of the double faced corrugated cardboard to set. The temperature of the cooler is maintained below 60° C., preferably about 45 to 55° C., by means of cold water or other suitable cooling medium. The double faced corrugated cardboard with both sheets is cut into suitable configurations for various applications.

Where the flat sheet and the corrugated sheet are composed of different thermoplastic resins, the adhesive property of the flat sheet alone can not often assure satisfactory bonding. In such a case it is advantageous to improve bonding between the flat sheet and corrugated sheet by sprinkling particles of a suitable substance such as calcium carbonate, on the surface of the flat sheet.

Further it is possible to provide multi-layered corrugated cardboards by forming corrugated sheets having corrugations inclined in opposite directions, superposing these corrugated sheets with their corrugations crossing each other and bonding flat sheets to the opposite sides of the assembly.

BRIEF DESCRIPTION OF THE DRAWING

The invention can be more fully understood from the following description of a preferred embodiment when taken in conjunction with the accompanying drawing in which:

FIG. 1 shows a diagrammatic side elevation of the apparatus for manufacturing corrugated cardboards with flat sheets bonded to both sides, and FIG. 2 shows a partial view of a modified arrangement for bonding a third sheet to a single faced corrugated board.

DESCRIPTION OF THE PREFERRED EMBODIMENT

Referring now to the accompanying drawings a sheet 10 to be corrugated and composed of a suitable thermoplastic resin is extruded through a suitable extruder 11 and is then passed through a nip between a pair of corrugating rolls 12 and 13. A second sheet 14 extruded through another extruder 15 is urged against the corrugations of the corrugated sheet 10 by means of a facer roll 16. As mentioned hereinabove, the sheet 10 is passed through the nip between corrugating rolls before it is sufficiently cooled to solidify or set so that shaping of the corrugations can be effected very readily. As the second corrugating roll 13 is maintained at a higher temperature (e.g. 75 to 110° C. in the case of polyethylene) than the first corrugating roll 12, the corrugated sheet adheres to the second corrugating roll and is carried therewith. However, before the corrugated sheet comes into contact with the second sheet it becomes sufficiently hard to withstand the pressure applied by facer roll 16. The second sheet 14 is still at a sufficiently high temperature to insure that it can be firmly bonded to the corrugated sheet without deforming the same.

After leaving the second corrugating roll 13, the single faced corrugated cardboard is passed around a cooling roller 17 to sufficiently cool and solidify the second sheet. Thus, a single faced corrugated cardboard with a flat sheet bonded to one side is produced.

To obtain a double faced corrugated cardboard with flat sheets bonded to its opposite sides, the single faced corrugated cardboard is passed through the nip between press rollers 20 and 21 via guide rollers 18 and 19. Between press roller 21 and one of the guide rollers 18 is disposed an endless belt 22 which is circulated in the direction indicated by the arrows in contact with the lower surface of the second sheet to apply tension thereto in the direction opposite to the direction of movement thereof to prevent waving of double faced corrugated cardboard when the third sheet is bonded thereto.

Since the single faced corrugated cardboard including corrugated sheet 10 and second sheet 14 is passed around a portion of the periphery of press roller 21 with sheet 10 facing outwardly and since the press roller 20 is rotated in a direction to pull forwardly the corrugations, the spacing or pitch between successive corrugations is broadened when a third sheet 23 supplied by an extruder 24 is bonded to the corrugations while it is still at a sufficiently high temperature to assure adhesion. In this manner, deflection of the finished corrugated cardboard after cooling can be prevented. The corrugated cardboard is then advanced via guide rollers 24 and 25 during which the second sheet 14 is cooled by a cooler 26 which is disposed to contact the lower surface of the second sheet 14, while the third sheet 23 is cooled by cooling air ejected from a nozzle 27. The temperature of the cooler 26 is maintained below 60°

C., preferably from 45 to 55° C. which is lower than the deformation temperature of the second sheet.

FIG. 2 shows a modified arrangement for bonding the third sheet 23 to the single faced corrugated board while the pitch of the corrugation is broadened. In this modification, a small roller 28 is provided at the entrance of the nip between rollers 20 and 21 to increase the peripheral length of the roller 21 in contact with the cardboard. It is preferable to mount the lower roller 21 to be adjustable in the vertical direction to vary said peripheral length.

I claim:

1. A method of manufacturing a plastic corrugated cardboard comprising,
    (1) extruding a first sheet of thermoplastic resin at a temperature higher than the melting point thereof,
    (2) corrugating said first sheet in a direction substantially perpendicular to the direction of extrusion while it is still at an elevated temperature permitting plastic deformation thereof by means of a pair of corrugating rolls maintained at a lower temperature than said first sheet,
    (3) maintaining one of said corrugating rolls carrying said corrugated sheet at a temperature higher than the other,
    (4) extruding a second sheet of thermoplastic resin at a temperature higher than the melting point thereof,
    (5) bonding said second sheet to said corrugated first sheet to form a single faced corrugated cardboard while said second sheet is at a sufficiently high temperature to maintain it in the plastic state and said first sheet is at a sufficiently high temperature to effect bonding, and
    (6) cooling said single faced corrugated cardboard.

2. The method according to claim 1 wherein said first sheet is passed through the nip of said pair of corrugating rolls to corrugate said sheet and said second sheet is bonded to said corrugated sheet by adhesion while said corrugated sheet is carried by one of said corrugating rolls.

3. A method of manufacturing a plastic corrugated cardboard comprising,
    (1) extruding a first sheet of thermoplastic resin at a temperature higher than the melting point thereof,
    (2) corrugating said first sheet in a direction substantially perpendicular to the direction of extrusion while it is still at an elevated temperature permitting plastic deformation thereof by means of a pair of corrugating rolls maintained at a lower temperature than said first sheet,
    (3) maintaining one of said corrugating rolls carrying said corrugated sheet at a temperature higher than the other,
    (4) extruding a second sheet of thermoplastic resin at a temperature higher than the melting point thereof,
    (5) bonding said second sheet to said corrugated first sheet to form a single faced corrugated cardboard while said second sheet is at a sufficiently high temperature to maintain it in the plastic state and said first sheet is at a sufficiently high temperature to effect bonding,
    (6) cooling the resultant single faced corrugated cardboard to cause its shape to set,
    (7) extruding a third sheet of thermoplastic resin at a temperature higher than the melting point thereof,
    (8) bonding said third sheet to said corrugated sheet on the side thereof opposite said second sheet while said third sheet is at a sufficiently elevated temperature to effect bonding to form a double faced corrugated cardboard, and
    (9) cooling said double faced corrugated cardboard.

4. The method according to claim 3 wherein said third sheet is bonded to said single faced corrugated cardboard in the state such that the pitch between successive corrugations is temporarily broadened.

5. The method according to claim 3 wherein tension is applied to said single faced corrugated cardboard in a direction opposite to the movement thereof immediately before said third sheet is bonded to said single faced corrugated cardboard.

References Cited

UNITED STATES PATENTS

| 2,719,566 | 10/1955 | Blatt | 156—205 |
| 3,024,496 | 3/1962 | Colombo | 156—500 X |
| 3,317,363 | 5/1967 | Weber | 156—210 |
| 3,004,880 | 10/1961 | Lord | 156—470 X |

BENJAMIN A. BORCHELT, Primary Examiner

G. E. MONTONE, Assistant Examiner

U.S. Cl. X.R.

156—470